(12) United States Patent
Sachse et al.

(10) Patent No.: US 7,167,535 B2
(45) Date of Patent: Jan. 23, 2007

(54) CIRCUIT SHARING FOR FREQUENCY AND PHASE ERROR CORRECTION

(75) Inventors: Eric Sachse, Dresden (DE); Uwe Eckhardt, Dresden (DE); Ingo Kühn, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 835 days.

(21) Appl. No.: 10/327,156

(22) Filed: Dec. 20, 2002

(65) Prior Publication Data

US 2004/0086070 A1    May 6, 2004

(30) Foreign Application Priority Data

Nov. 4, 2002    (DE) .................. 102 51 313

(51) Int. Cl.
  *H03D 3/24*    (2006.01)
(52) U.S. Cl. ..................... 375/375; 375/354
(58) Field of Classification Search ............... 375/375, 375/354
  See application file for complete search history.

(56) References Cited

U.S. PATENT DOCUMENTS

| | | | |
|---|---|---|---|
| 4,860,321 A | 8/1989 | von der Embse | |
| 6,304,582 B1 * | 10/2001 | Zhang et al. | 370/503 |
| 6,560,053 B1 * | 5/2003 | Ohta et al. | 360/51 |
| 6,603,801 B1 * | 8/2003 | Andren et al. | 375/147 |
| 6,614,836 B1 | 9/2003 | Halford et al. | |
| 6,650,187 B1 * | 11/2003 | Riddle et al. | 331/17 |
| 6,678,312 B1 * | 1/2004 | Mohindra | 375/150 |
| 6,895,255 B1 * | 5/2005 | Bridgelall | 455/552.1 |

OTHER PUBLICATIONS

Keller, et al: "Orthogonal Frequency Division Multiplex Synchronisation Techniques for Wireless Local Area Networks", IEEE International Symposium on Personal Indoor and Mobile Radio Communications, Oct. 15, 1996, pp. 963-967.

* cited by examiner

*Primary Examiner*—Temesghen Ghebretinsae
*Assistant Examiner*—Juan Alberto Torres
(74) *Attorney, Agent, or Firm*—Meyertons Hood Kivlin Kowert & Goetzel, P.C.; B. Noël Kivlin

(57) ABSTRACT

A WLAN (Wireless Local Area Network) receiver with a synchronization unit is provided, wherein the synchronization unit comprises a frequency error correction unit configured to perform a frequency error correction process, a phase error correction unit configured to perform a phase error correction process, a filter circuit capable of applying one of at least two different filter transfer functions, wherein a first one of said at least two different filter transfer functions is a frequency error correction filter transfer function for use in said frequency error correction process and a second one of said at least two different filter transfer functions is a phase error correction filter transfer function for use in said phase error correction process, and a controller unit connected to said filter circuit to select one of said at least two different filter transfer functions.

31 Claims, 4 Drawing Sheets

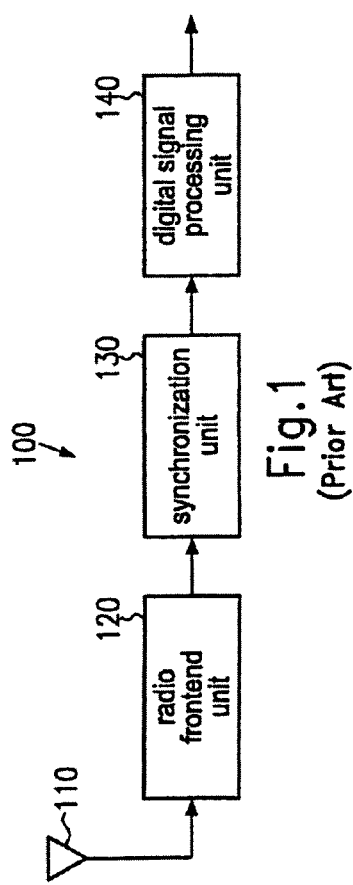
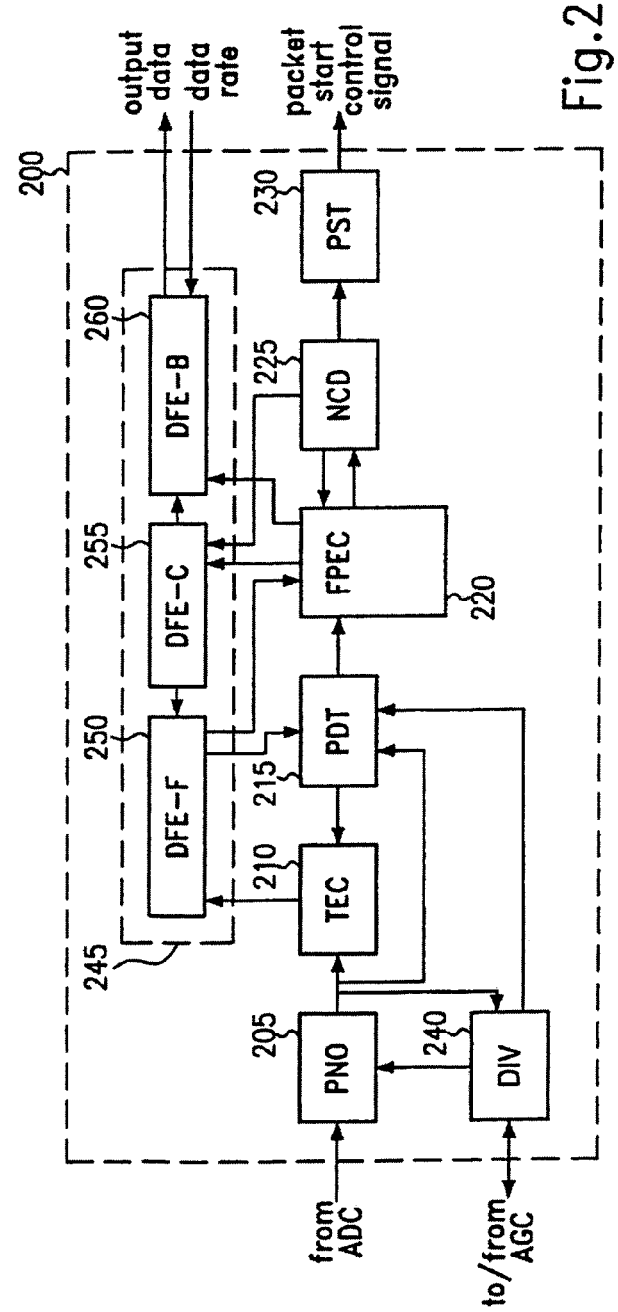

CIRCUIT SHARING FOR FREQUENCY AND PHASE ERROR CORRECTION

BACKGROUND OF THE INVENTION

1. Field of the Invention

The invention generally relates to a frequency error and phase error correction and/or detection for use in units or subunits of data communication systems, and in particular for use in WLAN (Wireless Local Area Network) receivers.

2. Description of the Related Art

In a communication system, it is important to synchronize the receiver to the transmitter so that messages can successfully be exchanged between the transmitter and the receiver, which is of particular importance for modern data communication systems such as wireless local area networks.

A wireless local area network is a flexible data communication system implemented as an extension to or as an alternative for a wired LAN. WLAN systems transmit and receive data over the air using radio frequency or infrared technology to minimize the need for wired connections. Thus, WLAN systems combine data connectivity with user mobility.

Most WLAN systems use spread spectrum technology, a wide-band radio frequency technique developed for use in reliable and secure communication systems. The spread spectrum technology is designed to trade-off band-width efficiency for reliability, integrity and security. Two types of spread spectrum radio systems are frequently used: frequency hopping and direct sequence systems.

The standard defining and governing of wireless local area networks that operate in the 2.4 GHz spectrum is the IEEE 802.11 standard. To allow higher data rate transmissions, the standard was extended to the 802.11b standard, which allows data rates of 5.5 and 11 Mbps in the 2.4 GHz spectrum. This extension is backwards compatible.

The standards for WLAN systems using direct sequence spread spectrum techniques employ a training preamble to train the receiver to the transmitter. Each transmitted data message comprises an initial training preamble followed by a data field. The preamble includes a sync field to ensure that the receiver can perform the necessary operations for synchronization. For the preamble length, two options have been defined, namely a long and a short preamble. All compliant 802.11b systems have to support the long preamble. The short preamble option is provided in the standard to improve the efficiency of the networks throughput when transmitting special data such as voice and video. The synchronization field of a preamble consists of 128 bits for a long preamble and 56 bits for a short preamble.

A receiver detects the synchronization symbols and aligns the receiver's internal clock to the symbols in the synchronization field in order to establish a fixed reference timeframe with which to interpret the fields in the transmission frame structure following the preamble. The preamble, including the synchronization field, is transmitted at the start of every message (data packet).

FIG. 1 shows a block diagram of a prior art WLAN receiver 100. Via one or more antennae 110 the receiver receives a data stream from a WLAN transmitter and feeds the antenna output to a radio front end unit 120. In the radio front end unit the received data signals are preprocessed and handed over to the synchronization unit 130. After synchronizing the received data signals the synchronized data signals are handed over to the digital signal processing unit 140 for further digital signaling processing. The antenna selection is done by the antenna diversity controller or finite state machine.

Its purpose is to measure at the beginning of the preamble which antenna delivers the strongest signal. This antenna will be the receive antenna for the frame. After selecting the antenna the preamble is detected by a preamble detection unit that scans the incoming data stream for a preamble while the receiver is in the receive mode. Its purpose is to detect a preamble and to determine whether a short or a long preamble is being received. It will also determine the boundaries between consecutive Barker symbols such that the following processing blocks can adjust their processing schedule accordingly. Finally, it will deliver an initial frequency error estimate that will be used in the frequency error correction module for an initial frequency error correction. Moreover, a synchronization unit performs a phase error correction for the remaining phase drift after the frequency error correction.

In WLAN systems, as well as in other spread spectrum communication systems, the signal-experiences a variety of distortions on its way from the transmitter to the receiver, which result in frequency an phase changes of the signal. Furthermore, a frequency or phase error may result from a frequency or phase offset of the radio frequency oscillators at the transmitter and the receiver. Moreover, the oscillators may provide different frequencies due to manufacturing imperfections, different temperatures, etc. which result in a frequency drift off the base band signal. Therefore, the synchronization unit performs a frequency error correction and a phase error correction.

Conventional frequency error correction modules in receivers still have a number of disadvantages. One problem is that frequency error correction modules need to perform a time-consuming number of iterated steps to achieve frequency synchronization.

First stage frequency offset corrector mostly does only course compensation. Nevertheless a residual frequency offset remains. A frequency-offset distortion can be viewed as a constantly changing phase-drift, which rotates in the complex plane with the frequency offset. This phase-drift causes a constant phase estimation error in the phase error correction. This error depends equally on the frequency-offset value and the group delay of a phase error correction low-pass filter. This results in performance degradation.

Conventional phase error correctors are designed to compensate for a static or slow varying phase-offset. To be stable against noise and distortions they always need to average over a certain number of phase-estimates to filter out those variations. This low-pass filter employs a system specific delay of the averaged phase estimates against the actual incoming signal to be phase corrected. If the phase variations are slow enough this effect does not matter but for quicker phase variations a residual phase-offset remains even after correction. In a following coherent decoding/demodulation part of the receiver this residual offset causes performance degradation.

Although different circuits and methods are known in the art to speed up the acquisition time of phase locked loops and to reduce frequency-offsets they often have been insufficient for compensating for the residual frequency offset and the actual phase offset. Furthermore, the conventional techniques often cannot provide a fast enough convergence and strong enough noise resistance.

Due to the wide range of different tasks the synchronization circuits in existing WLAN receivers are very complex. As the digital signal processing functions need a plurality of functional units the circuits are highly involved. Therefore the costs of circuit development and manufacturing are high.

SUMMARY OF THE INVENTION

An improved receiver, integrated circuit chip and operation method are provided that may allow a simple and less complex implementation, and improve correction precision, reliability and accuracy for a frequency error and phase error correction and/or detection for use in units or subunits of data communication systems.

In one embodiment, there is provided a WLAN (Wireless Local Area Network) receiver with a synchronization unit. The synchronization unit comprises a frequency error correction unit configured to perform a frequency error correction process and a phase error correction unit configured to perform a phase error correction process. Furthermore, the synchronization unit comprises a filter circuit capable of applying one of at least two different filter transfer functions, wherein a first one of the at least two different filter transfer functions is a frequency error correction filter transfer function for use in the frequency error correction process and a second one of the at least two different filter transfer functions is a phase error correction filter transfer function for use in the phase error correction process. Additionally, the synchronization unit comprises a controller unit connected to the filter circuit to select one of the at least two different filter transfer functions.

In a further embodiment, there is provided a WLAN (Wireless Local Area Network) receiver having a synchronization unit. The synchronization unit comprises the synchronization unit comprises a frequency error correction unit configured to perform a frequency error correction process, a phase error correction unit configured to perform a phase error correction process, an angle decoder circuit configured to perform an angle decoder process in one of at least two modes, wherein a first one of the at least two modes is a frequency error correction mode for use of the angle decoder circuit in the frequency error correction process and a second one of the at least two modes is a phase error correction mode for use of the angle decoder circuit in the phase error correction process, and a controller unit connected to the angle decoder circuit to select one of the at least two modes.

In still a further embodiment, there is provided a data communication receiver with a synchronization unit. The synchronization unit comprises a frequency error correction unit configured to perform a frequency error correction process and a phase error correction unit configured to perform a phase error correction process. Furthermore, the synchronization unit comprises a filter circuit capable of applying one of at least two different filter transfer functions, wherein a first one of the at least two different filter transfer functions is a frequency error correction filter transfer function for use in the frequency error correction process and a second one of the at least two different filter transfer functions is a phase error correction filter transfer function for use in the phase error correction process. Additionally, the synchronization unit comprises a controller unit connected to the filter circuit to select one of the at least two different filter transfer functions.

In still a further embodiment, there is provided an integrated circuit chip for use in a data communication receiver, wherein the chip comprises a synchronization unit. The synchronization unit comprises a frequency error correction unit configured to perform a frequency error correction process and a phase error correction unit configured to perform a phase error correction process. Furthermore, the synchronization unit comprises a filter circuit capable of applying one of at least two different filter transfer functions, wherein a first one of the at least two different filter transfer functions is a frequency error correction filter transfer function for use in the frequency error correction process and a second one of the at least two different filter transfer functions is a phase error correction filter transfer function for use in the phase error correction process. Additionally, the synchronization unit comprises a controller unit connected to the filter circuit to select one of the at least two different filter transfer functions.

In another embodiment, there is provided a method of operating a synchronization unit in a data communication receiver. The method comprises performing a frequency error correction process for correcting frequency errors and performing a phase error correction process for correcting phase errors. Furthermore, the method comprises performing a filter process comprising applying one of at least two different filter transfer functions, wherein a first one of the at least two different filter transfer functions is a frequency error correction filter transfer function for use in the frequency error correction process and a second one of the at least two different filter transfer functions is a phase error correction filter transfer function for use in the phase error correction process. Additionally, the method comprises performing a control process on the filter process comprising selecting one of the at least two different filter transfer functions.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following, and more particular description of the invention as illustrated in the accompanying drawings, wherein:

FIG. 1 shows a block diagram illustrating a conventional WLAN receiver;

FIG. 2 shows a block diagram illustrating the components of WLAN receiver according to an embodiment;

DETAILED DESCRIPTION OF THE INVENTION

Figure 3:
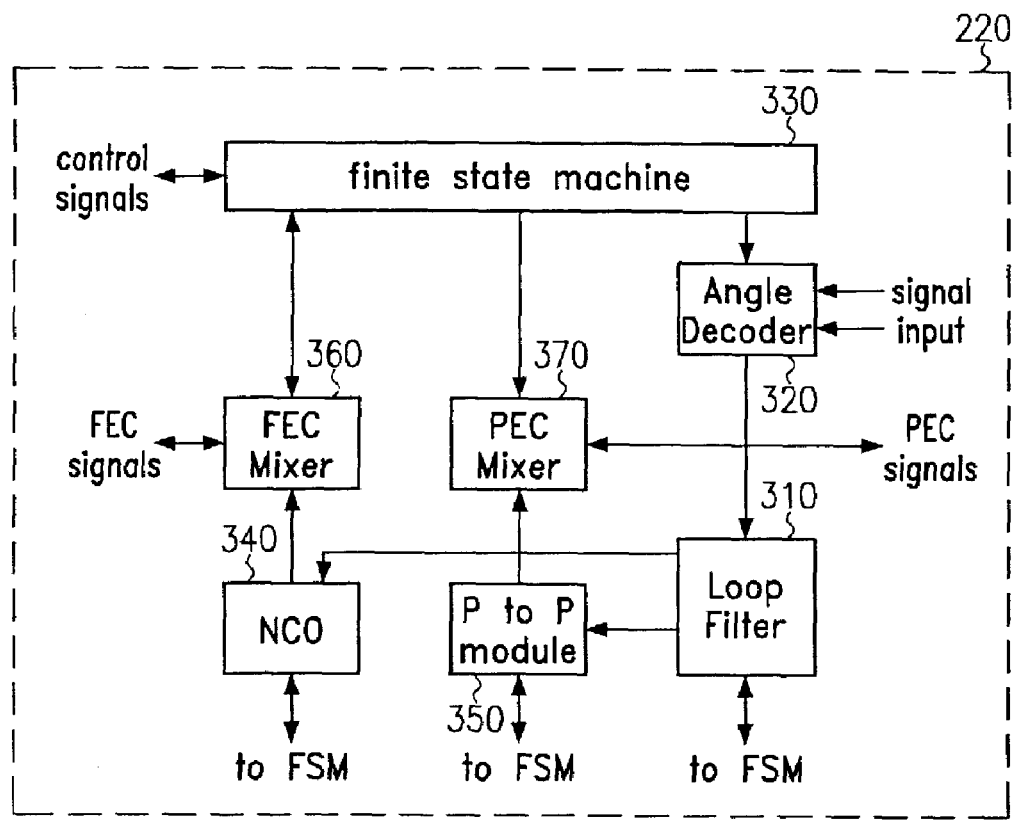
FIG. 3 shows a block diagram illustrating the components of the FPEC unit of a WLAN receiver according to an embodiment.

The illustrative embodiments of the present invention will be described with reference to the figure drawings, wherein like elements and structures are indicated with like reference numbers.

Referring now to the drawings, in particular to FIG. 2, which illustrates the components of a WLAN receiver according to the present embodiment. The receiver has a radio-frequency part and a base band part 200 that is connected to the radio frequency part. The radio-frequency part is an analog circuit that receives an analog signal and provides a digitized representation thereof to the base band part 200. For this purpose, the radio-frequency part comprises an analog-to-digital converter (ADC).

Moreover, the radio-frequency part performs an automatic gain control (AGC) to control the amplification gain dependent on a received signal power or strength. The AGC unit is located in the analog radio frequency part and interchanges control signals with the digital circuitry of the base band part 200.

The base band part 200 of the WLAN receiver of the present embodiment shown in FIG. 2 has a number of units that are interconnected to form a data path. That is, the base band part 200 receives the digitized input signal from the radio frequency part and generates output data that is to be filtered, demodulated, decoded and descrambled for further processing.

When receiving the digitized input signal in the base band part 200, a power normalization (PNO) is performed in unit 205 normalized the power of the input signal. The power normalization may be performed on the control of an antenna diversity (DIV) unit 240 that controls antenna diversity and which is connected to the automatic gain-controller of the radio-frequency part. For performing the diversity selection, unit 240 receives the normalized signal from unit 205.

The antenna diversity unit 240 may further provide a control signal to preamble detection (PDT) unit 215. The preamble detection unit 215 receives the normalized signal from unit 205 and detects a preamble in the signal.

As may be seen from FIG. 2, the preamble detection unit 215 provides output signals to a timing error correction (TEC) unit 210 and a frequency and phase error correction (FPEC) unit 220 and the FPEC unit 220 its output signal to a non-coherent detection unit 225. The FPEC unit is used to detect and correct timing errors and frequency and phase errors, respectively. In the present embodiment, the FPEC unit is one single unit, however it comprises two functional units, the frequency error correction unit and the phase error correction unit, which share specific circuits. The frequency control/detection and the phase control/detection are done in two separate stages, and the phase error correction is performed based on a signal that has previously been corrected with respect to a frequency error.

In an alternative to the present embodiment of the present embodiment the FPEC unit 220 provides also a sequential detection of the frequency errors and the phase errors and a parallel post processing for the correction of the frequency errors and the phase errors.

As mentioned above, the preamble detection unit 215 receives the normalized input signal from power normalization unit 205. In addition, it receives input from the feed forward filter (DFE-F) 250 of a decision feedback equalizer 245. The feed forward filter 250 receives the output signal of the timing error correction unit 210 and filters the signal under control of the decision feedback equalization controller (DFE-C) 255. A filtered signal is fed to the preamble detection unit 215.

As can further be seen from FIG. 2, the decision feedback equalization controller 255 may operate dependent on certain input signals that are received from the frequency error correction unit 220 and/or the non-coherent detection (NCD) unit 225. The non-coherent detection unit 225 filters and demodulates a signal that is received from the FPEC unit 220 to obtain a demodulated binary reference sequence. This binary reference sequence is fed into the decision feedback equalization controller 255 for joint processing with the data signal coming from FPEC unit 220.

As apparent from the figure, the phase error correction unit 220 further provides an input signal to the feedback signal 260 of the decision feedback equalizer 245. The feedback filter 260 filters this data to provide output data, and the decision feedback equalization controller 255 controls it. Further, the feedback filter 260 may receive a signal, which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

As apparent from the foregoing description of the present embodiment, the receiver comprises a number of units that form a data path. Each unit is for performing a given function in the synchronization (equalization and tracking) process. As each function of the individual units is required in only a given period of time, the units are activated in the present embodiment in a predetermined sequence. Once the function of the given unit is no longer required, the unit may be deactivated.

FIG. 3 shows a block diagram illustrating the components of the FPEC unit 220 of the present embodiment. The frequency error correction (FEC) unit and the phase error correction (PEC) unit are integrated in the FPEC unit as both units share specific circuits. FIG. 3 gives a schematic overview how both functional units are combined in the FPEC unit 220.

In particular, both units share an angle decoder circuit and a filter circuit, which is a loop filter circuit in the present embodiment. The input signals either for the FEC process or the PEC process are forwarded to the angle decoder circuit 320, which removes a modulation caused by ambiguity from the feedback signal according to the modulation type present (differential binary phase shift keying or differential quadrature phase shift keying). For the FEC process and the PEC process the angle decoder unit provides at least one operation mode each. The output of the angle decoder unit is an estimate for the phase deviation and this output is forwarded to the loop filter circuit 310.

In the present embodiment the loop filter circuit 310 provides at least two different filter transfer functions, wherein a first one of the at least two different filter transfer functions is a frequency error correction filter transfer function for use in the FEC process and a second one of the at least two different filter transfer functions is a phase error correction filter transfer function for use in the PEC process. The output of the loop filter circuit 310 is forwarded to the numerical control oscillator circuit 340, if the FEC process operates the loop filter circuit. If the loop filter circuit 310 is operated by the PEC process the output of the loop filter circuit is forwarded to the phase to phasor module 350. For this the loop filter circuit provides two different output ports.

Alternatively the loop filter circuit provides only one output port and the output signal of the loop filter circuit is forwarded to the NCO circuit and the phase to phasor module via a multiplexer which is controlled by the controller unit.

The numerical control oscillator (NCO) converts the phase drift per sample to a complex pointer with amplitude of the value 1 rotating with the appropriate frequency. This signal is passed to the FEC mixer circuit 360 which multiplies the incoming signal with the conjugate value to compensate the frequency offset and thus closes the FEC loop.

In the phase to phasor module 350 the results of the loop filter process are also converted into a complex pointer with a magnitude 1. Therefore, the phase to phasor module 350 is similar to the NCO circuit 340, however the NCO circuit additionally comprises an integrator for integrating the phase values. The results of the phase to phasor module 350 are forwarded to the PEC mixer circuit 370. The PEC mixer circuit multiplies the incoming chips from the feed forward filter (DFE-F) 250 with a conjugate value of the results of the phase to phasor module such that the PEC loop is closed and coherence is achieved.

A controller 330 or a finite state machine controls the angle decoder circuit 320, the loop filter circuit 310, the phase to phasor module 350, the NCO circuit 340, the FEC mixer circuit 360 and the PEC mixer circuit 370. Furthermore, the controller 330 provides input ports and output ports to send and receive further control signals to other controllers or finite state machines within the synchronization unit.

As above mentioned the FEC process and the PEC process share sequentially the angle decoder circuit and the loop filter circuit. The controller 330 selects the specific mode together with specific functions in these two circuits dependent whether these circuits are operated in the FEC process or the PEC process. That is, that the controller unit 330 selects one of the at least two modes of the angle decoder unit and one of the at least two different filter transfer functions in accordance to the performed error correction process.

Alternatively, the circuits in the FPEC unit 220 provide further input and/or output ports for additional sync or clock signal, reset or mode selection signals. Consequently, clock and reset signals are provided to the loop filter circuit, the NCO circuit, the phase to phasor module, the FEC mixer circuit, the PEC mixer circuit and the angle decoder circuit. Furthermore, these modules receive activation signals from the finite state machine 330 either for the FEC mode or the PEC or both. Moreover, the angle decoder circuit, the FEC mixer circuit and the PEC mixer circuit alternatively provide different input and output ports for the real and imaginary part of the input and output signals.

Alternatively, the loop filter circuit provides input ports for control signals for selecting different loop filter transfer functions, if the loop filter circuit provides more than one loop filter transfer function for the FEC mode or the PEC mode.

In a further alternative of the NCO circuit and the FEC mixer circuit the output signal of the NCO circuit is separated into a sine and a cosine part and forwarded to the FEC mixer circuit. Similarly, the output results of the phase to phasor module are alternatively forwarded to the PEC mixer circuit.

Figure 4:
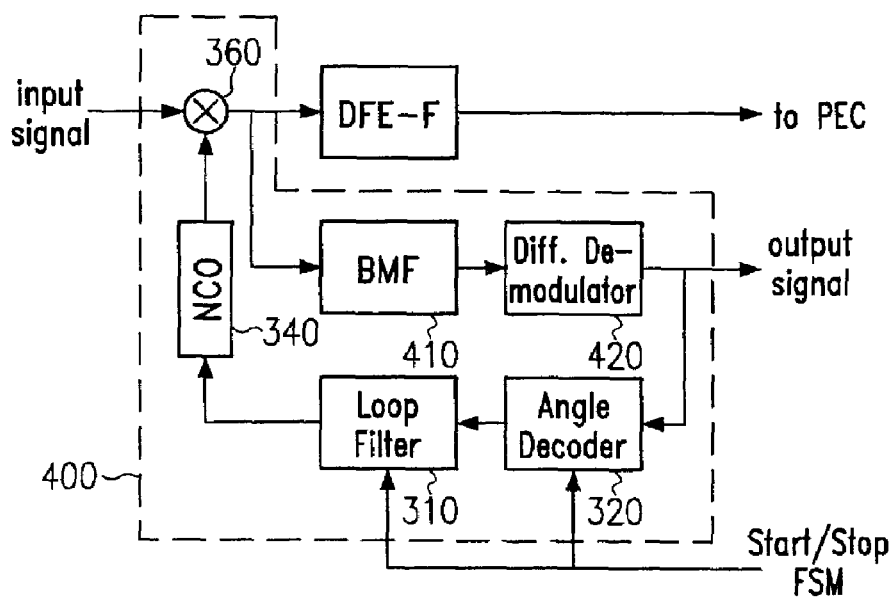
FIG. 4 shows a block diagram illustrating the components of the FEC unit of the FPEC unit according to an embodiment.

FIG. 4 shows a block diagram illustrating the components of the FEC unit 400 of the FPEC unit 220 according to the present embodiment in more detail. In the FEC mode the FPEC unit 220 is configured so that the FEC mixer 360 is placed on the 22 MHz data path behind the timing error correction unit 210 and before the forward filter of the decision feedback equalizer controller 255 or a channel matched filter respectively. The FEC loop further comprises a Barker matched filter circuit 410 for correlating a Barker spreading code and a differential demodulator 420 applying in the present embodiment to the input signals a function proportional to x(k)·conj(x(k−1))).

To form this FEC loop the time error correction unit 210 is connected to the FEC mixer 360 to forward the signals. Furthermore, the FEC mixer is connected to the forward filter of the decision feedback equalization controller 255 or the general matched filter respectively and connected to the Barker matched filter. Accordingly, the Barker matched filter circuit is connected to the demodulator and the demodulator to the angle decoder 320. Thus the FEC loop is closed and the frequency error correction procedure can be performed repeatedly and this feedback loop.

Furthermore, the angle decoder circuit and the loop filter circuit provide input ports for additional control signals from the controller unit such as start and stop control signals for starting and stopping the angle decoder process and the loop filter process respectively.

In detail, as already discussed above, the FEC process compensates for frequency offset caused by oscillator deviations. It is part of the inner receiver synchronization process during a preamble or header period. As the inner receiver channel estimation and equalization modules rely on frequency offset compensated data path signals, a feedback structure was chosen to provide fast and accurate iterative acquisition and correction of the frequency offset. The symbol based technique using Barker despreading assures resistance against noise and other distortions.

The Barker matched filter circuit 410 and the demodulator 420 which is a differential demodulator, pass a complex DBPSK or DQPSK modulated phasor at a rate of 1 MHz to the angle decoder circuit 320, which is a value for the actual phase drift per Barker symbol duration, modulated with the preamble or header data respectively.

The angle decoder circuit removes the modulation caused ambiguity from the feedback signal according to the present modulation type (DBPSK, DQPSK) and computes the argument of the complex signal using first order arctan-approximation and saturation. The output of the angle decoder circuit is a phase estimate proportional to the presently remaining frequency offset. This output is forwarded to the loop filter circuit 310.

The loop filter circuit consists of a $1^{st}$ order low pass filter and an accumulator, which are activated by the controller unit 330 in the FEC process. The loop filter circuit establishes a FEC filter transfer function, which assures fast and stable frequency offset acquisition with high accuracy to minimize the remaining frequency offset. The output of the loop filter circuit is a filter estimate for the absolute frequency offset per sample, which is passed to the NCO circuit 340. The NCO circuit converts the phase drift per sample in a complex pointer with amplitude 1 rotating with the appropriate frequency. The NCO circuit outputs the results of the conversion process to the FEC mixer 360 which multiplies the incoming signals with the conjugate value to compensate the frequency offset and thus closes the FEC loop.

In an alternative to the present embodiment the Barker matched filter circuit 410 and differential demodulator 420 are part of the non-coherent detection unit 225 and shared with this unit.

Figure 5:
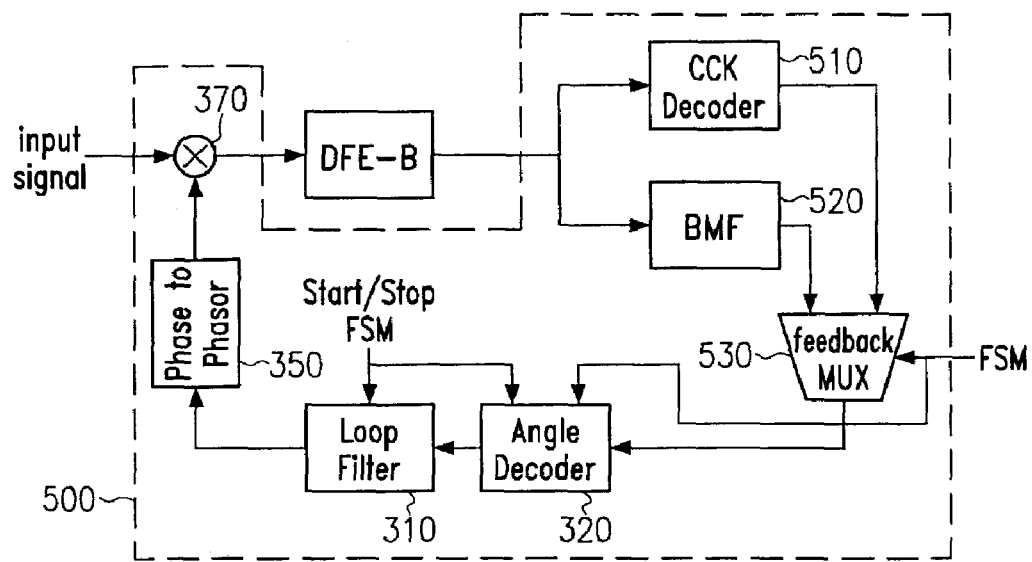
FIG. 5 shows a block diagram illustrating the components of the PEC unit of the FPEC unit according to an embodiment.

FIG. 5 shows a block diagram illustrating the components of the PEC unit 500 of the FPEC unit 220 according to the present embodiment in more detail. As described above the PEC process preserves coherence for the signal data path. This means that the remaining phase drift after the FEC process is compensated and the signals constellation diagram has been tracked and adjusted to match slash or square constellation is required respectively. Similar to the FEC unit a symbol based feedback loop is used for the PEC process.

For this the PEC mixer 370 receives the output signals of the FEC unit and is connected to the decision feedback equalizer unit 260 which forwards the received signals to a complimentary code keying (CCK) decoder circuit 510 or a Barker matched filter circuit 520 respectively in accordance whether the symbol rate of the received signals is 1.375 MHz or 1 MHz. In accordance to the symbol rate of the received signals a binary phase shift keying (BPSK) or quadrature phase shift keying (QPSK) modulated complex phasor is forwarded to the angle decoder circuit 320 via a feedback multiplexer 530 which is also controlled by the controller unit 330 and which selects the input ports of the feedback multiplexer in accordance whether the symbol rate is 1.375 MHz or 1 MHz.

In the PEC mode selected by the controller unit 330, this angle decoder circuit extracts an estimate for the phase deviation relative to the actual constellation diagram and passes its argument to the loop filter circuit 310.

For the PEC process the controller unit 330 selects the PEC filter transfer function in the loop filter circuit 310. This filter transfer function averages a phase offset estimate for further noise suppression and compensates for the residual phase offsets. The results of this loop filter process are a more reliable estimate for the actual phase offset per sample. This result is forwarded to the phase to phasor module 350 which converts the forwarded signals into a complex phasor using the phase to phasor module which is similar to the NCO circuit used in the FEC unit as above mentioned. The phase to phasor module 350 feeds the converted signal back to the PEC mixer 370 thus closing the PEC loop.

In a modification of the present embodiment the CCK decoder circuit 510, the Barker matched filter circuit 520 and the feedback multiplexer 530 of the PEC unit 500 are shared with another functional unit of the synchronization unit 130.

Figure 6:
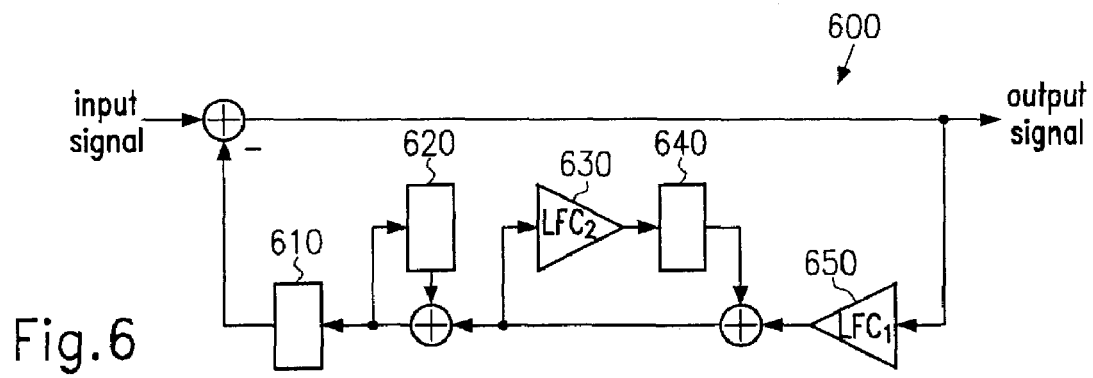
FIG. 6 shows a block diagram illustrating the frequency error correction transfer function according to an embodiment.

FIG. 6 shows a block diagram illustrating the frequency error correction filter transfer function circuitry 600 according to the present embodiment. As mentioned above, the controller unit 330 selects this filter transfer function when the FPEC unit is operated in the frequency error correction mode. As the loop filter circuit 310 is shared between the FEC process and the PEC process the loop filter circuit provides at least two different filter transfer functions.

In detail, FIG. 6 depicts a system model for the general FEC loop. The input signal is fed forward to a loop attenuation unit 650 with a loop filter constant $LFC_1$. The output of the loop attenuation unit 650 is fed to a loop attenuation unit 630 with a loop filter constant $LFC_2$ and a delay unit 640 and added with an adder to the output of the loop attenuation unit 650. This result is forwarded to a loop integrator formed by an adder and a delay unit 620. The output of the loop integrator is delayed by the delay unit 610 and fed back to the input signal.

Actually, this loop is a high pass filter canceling out the constant frequency offset of an input signal. In the present embodiment $LFC_1$ and $LFC_2$ are adjustable loop filter constants.

The transfer function according to the displayed FEC loop transfer function is described as:

$$G_{\varpi}(z) = \frac{1}{1 + \frac{1}{1-z^{-1}} \cdot z^{-2} \cdot \alpha_{\omega}(z)},$$

wherein $\alpha_{\omega}(z)$ is the FEC transfer function for the loop filter circuit 310. In the present embodiment the loop filter circuit provides an infinite impulse response (IIR) $1^{st}$ order low pass filter function and alternatively a second order low pass filter function, described as:

$$\alpha_{\omega}(z) = \frac{LFC_1}{1 - LFC_2 \cdot z^{-1}}.$$

The FEC loop filter transfer function is designed to operate at a sampling rate of 1 MHz, which is equivalent to the Barker symbol rate. Thus the output of the loop filter circuit is a filtered estimate of the phase drift per Barker symbol. As the FEC mixer circuit 360 works directly on the 22 MHz signal data path the loop filter circuit output has to be divided by 22 to provide the NCO circuit with the appropriate phase drift per sample.

Figure 7:
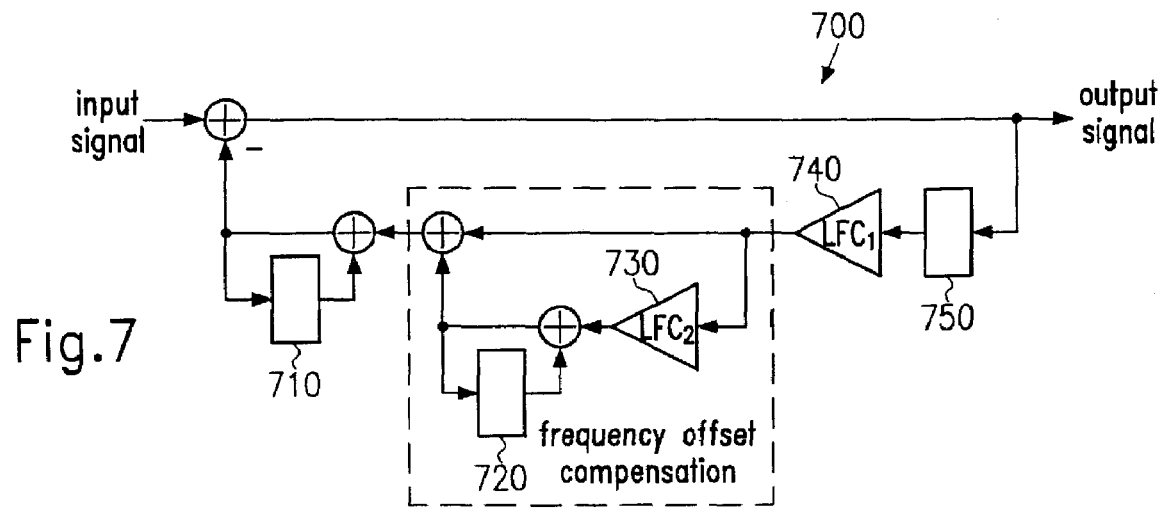
FIG. 7 shows a block diagram illustrating the phase error correction transfer function according to an embodiment.

FIG. 7 shows a block diagram illustrating the phase error correction filter transfer function circuitry 700 according to the present embodiment. Similar to FIG. 6, a system model for the general PEC loop is shown.

The input signal is fed forward to a delay unit 750 and a loop attenuation unit 740 with a loop filter constant $LFC_1$. The output of the loop attenuation unit 740 is fed to a frequency offset compensation formed by a loop attenuation unit 730 with a loop filter constant $LFC_2$ and a delay unit 720. In the frequency offset compensation the output of the loop attenuation unit 740 is fed to the loop attenuation unit 730 and then further processed with a loop integrator formed by an adder and the delay unit 720. The results of the loop integrator are added to the output of the loop attenuation unit 740. The results of the adder are further processed by a loop integrator formed by an adder and a delay unit 710. The output of the loop integrator is fed back to the input signal. In the present embodiment $LFC_1$ and $LFC_2$ are adjustable loop filter constants.

The transfer function according to the displayed PEC loop transfer function is described as:

$$G_{\phi}(z) = \frac{1}{1 + \alpha_{\phi}(z) \cdot z^{-1}},$$

wherein $\alpha_{\phi}(z)$ is the PEC transfer function for the loop filter circuit 310. To compensate the remaining frequency offset the following PEC loop filter transfer function is selected for the present embodiment:

$$\alpha_{\phi}(z) = \frac{LFC_1}{1-z^{-1}} \cdot \left(1 + \frac{LFC_2}{1-z^{-1}}\right).$$

The shown PEC loop filter transfer function comprises a frequency offset compensation, which compensates the remaining frequency offset. Commonly used PEC loop filter comprise only a loop attenuation unit 740 and a loop integrator. The frequency offset compensation used in the present embodiment provides a long term average of the phase error per symbol, which is continuously added to the loop integrator with an adjustable weight of $LFC_2$. To assure stability $LFC_2$ is smaller than $LFC_1$. Thus a static phase error is eliminated, which appears in commonly used PEC loop filters.

Figure 8:
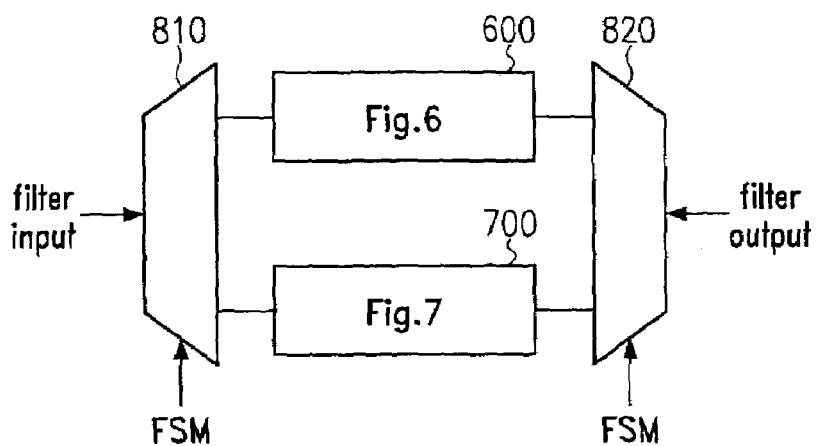
FIG. 8 shows a schematic diagram illustrating the loop filter of FIG. 6 and FIG. 7 according to an embodiment.

FIG. 8 shows a schematic diagram illustrating the loop filter of FIG. 6 and FIG. 7 according to another embodiment. In a general way it is illustrated how the controller unit or finite state machine 330 selects the different loop filter transfer functions. A demultiplexer 810 receives a filter input signal. The finite state machine selects the operation mode of the demultiplexer in accordance to the operation mode of the FPEC unit 220. If the FPEC unit is operating in the FEC mode the demultiplexer 810 connects the filter input signal to the components providing the FEC filter transfer function according to FIG. 6 and forwards the results of this filter transfer functions via the multiplexer 820 to the components following in the data path. If the FPEC unit is operated in the PEC mode the finite state machine controls the demultiplexer 810 and the multiplexer 820 so that the filter input signal is connected to the components of the loop filter providing the phase error correction filter transfer function according to FIG. 7 and via the demultiplexer 810 to the components following in the data path.

Figure 9:
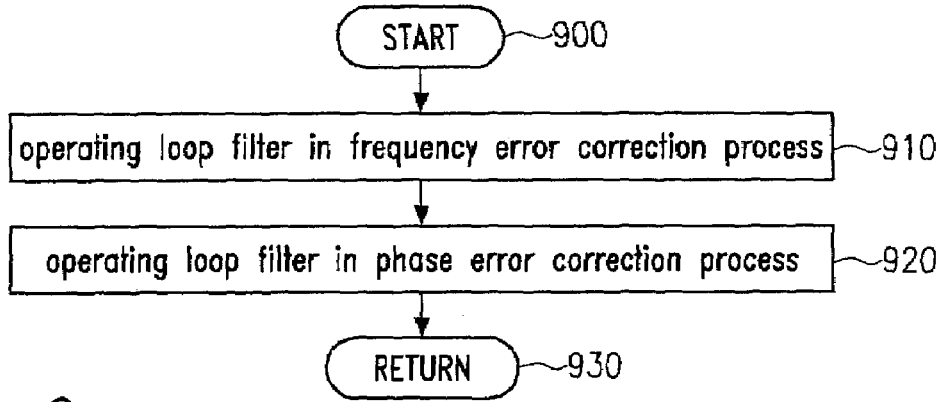
FIG. 9 shows a flow chart illustrating the loop filter operation process according to an embodiment.

FIG. 9 shows a flowchart illustrating the loop filter operating process according to the present embodiment. As mentioned above, the FEC process and the PEC process share the loop filter circuit. The method begins with step 900. As these processes are operated sequentially the loop filter circuit is set into a first operation mode by the finite state machine 330 to provide the frequency error correction transfer function for the FEC process (step 910) and set to a second mode to provide the phase error correction filter transfer function for the PEC process (step 920). At this point, step 930 provides a return to start 900.

Figure 10:
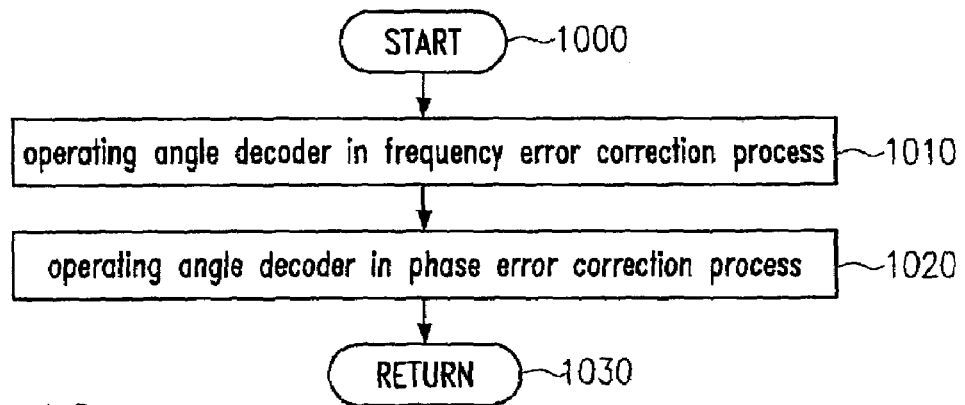
FIG. 10 shows a flow chart illustrating the angle decoder operation process according to an embodiment.

FIG. 10 shows a flowchart illustrating the angle decoder operation process according to the present embodiment. Similarly to the loop filter circuit 310 the FEC process and the PEC process share the angle decoder circuit 320. The method begins with step 1000. As described above, the angle decoder circuit 320 is arranged to be operated in a first mode set by the finite state machine 330, if the FPEC unit is operated in the FEC mode (step 1010) and operated in a second mode, if the FPEC unit is operated in the PEC mode (step 1020). At this point, step 1030 provides a return to start 1000.

Various embodiments as described above may advantageously provide a faster convergence and a stronger noise resistance. Furthermore they compensate residual frequency offsets and thus establish accurate BPSK-QPSK constellation diagrams. Due to the sharing of circuits in different processes the improved receiver and operation mode may provide a smaller number of gates resulting in a smaller die area and furthermore reducing manufacturing costs.

While not limited to WLAN receivers, the embodiments may be advantageously used in IEEE 802.11b compliance systems.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art of familiar have not been described herein in order not to unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver having a synchronization unit, said synchronization unit comprising:
   a frequency error correction unit configured to perform a frequency error correction process;
   a phase error correction unit configured to perform a phase error correction process;
   a filter circuit capable of applying one of at least two different filter transfer functions, wherein a first one of said at least two different filter transfer functions is a frequency error correction filter transfer function for use in said frequency error correction process and a second one of said at least two different filter transfer functions is a phase error correction filter transfer function for use in said phase error correction process;
   an angle decoder circuit configured to perform an angle decoder process in one of at least two modes, wherein a first one of said at least two modes is a frequency error correction mode for use of said angle decoder circuit in said frequency error correction process and a second one of said at least two modes is a phase error correction mode for use of said angle decoder circuit in said phase error correction process; and
   a controller unit connected to said filter circuit to select one of said at least two different filter transfer functions, wherein said controller unit is connected to said angle decoder to select one of said at least two modes and said frequency error correction unit and said phase error correction unit comprise said filter circuit and said angle decoder circuit for performing the respective error correction process.

2. The WLAN receiver of claim 1, wherein said filter circuit is a loop filter circuit with said first filter transfer function comprising a first order low pass filter function and an accumulator function and with a third transfer filter function comprising a frequency offset compensation function.

3. The WLAN receiver of claim 1, wherein said filter is a loop filter circuit with said first filter transfer function comprising a second order low pass filter function and with a third transfer filter function comprising a frequency offset compensation function.

4. The WLAN receiver of claim 3, wherein signals received by said angle decoder circuit are complex BPSK (binary phase shift keying) or QPSK (quadrature phase shift keying) modulated input signals.

5. The WLAN receiver of claim 4, wherein said angle decoder circuit is further configured to output a angle decoder output signal corresponding to a phase estimate proportional to a frequency offset of said received signals when said first mode is selected, and a signal corresponding to an estimate for a phase offset relative to a constellation diagram of said received signals when said second mode is selected.

6. The WLAN receiver of claim 5, wherein said angle decoder circuit is further configured to forward said angle decoder output signal to said loop filter circuit.

7. The WLAN receiver of claim 6, wherein said loop filter circuit is further configured to forward a loop filter output signal corresponding to a filtered estimate for said frequency offset, when said frequency error correction filter transfer function is selected, and a signal corresponding to a filtered estimate for said phase offset, when said phase error correction filter transfer function is selected.

8. The WLAN receiver of claim 7, further comprising:
a numerical controlled oscillator circuit configured to convert said signal corresponding to said filtered estimate for said frequency offset forwarded from said loop filter circuit; and
a phasor module configured to convert said signal corresponding to a filtered estimate for said phase offset forwarded from said loop filter circuit.

9. The WLAN receiver of claim 8, further comprising a Barker-Matched filter circuit and a demodulator circuit wherein said Barker-Matched filter circuit is connected to said demodulator circuit and said demodulator circuit is configured to output demodulated signals to said angle decoder circuit.

10. The WLAN receiver of claim 9, wherein said angle decoder circuit and said loop filter circuit are arranged to receive a start and stop signal from said controller unit for starting and stopping said angle decoder process and said filtering process.

11. The WLAN receiver of claim 10, wherein said Barker-Matched filter circuit, said demodulator circuit, said angle decoder circuit, said loop filter circuit and said numerical controlled oscillator circuit are arranged to form a symbol-based feedback loop.

12. The WLAN receiver of claim 11, wherein said controller unit is a finite state machine.

13. The WLAN receiver of claim 12, wherein said frequency error correction unit and said phase error correction unit are arranged to be operated sequentially.

14. The WLAN receiver of claim 13, wherein said frequency error correction unit and said phase error correction unit are arranged to perform additionally a parallel post processing of said frequency error correction process and/or said phase error correction process.

15. The WLAN receiver of claim 8, further comprising a CCK (complementary code keying) decoder circuit, a Barker-Matched filter circuit and a multiplexer wherein said CCK (complementary code keying) decoder circuit and said Barker-Matched filter circuit are connected via said multiplexer circuit to said angle decoder circuit.

16. The WLAN receiver of claim 15, wherein said angle decoder circuit and said loop filter circuit are arranged to receive a start and stop signal from said controller unit for starting, and stopping said angle decoder process and said filtering process.

17. The WLAN receiver of claim 16, wherein said CCK decoder circuit, said Barker-Matched filter circuit, said multiplexer, said angle decoder circuit, said loop filter circuit and said second numerical controlled oscillator circuit are arranged to form a symbol-based feedback loop.

18. The WLAN receiver of claim 17, wherein said controller unit is a finite state machine.

19. The WLAN receiver of claim 18, wherein said frequency error correction unit and said phase error correction unit are arranged to be operated sequentially.

20. The WLAN receiver of claim 19, wherein said frequency error correction unit and said phase error correction unit are arranged to perform additionally a parallel post processing of said frequency error correction process and/or said phase error correction process.

21. The WLAN receiver of claim 7, further comprising one single numerical controlled oscillator circuit configured to convert said signals forwarded from said loop filter circuit.

22. A WLAN (Wireless Local Area Network) receiver having a synchronization unit, said synchronization unit comprising:
a frequency error correction unit configured to perform a frequency error correction process;
a phase error correction unit configured to perform a phase error correction process;
an angle decoder circuit configured to perform an angle decoder process in one of at least two modes, wherein a first one of said at least two modes is a frequency error correction mode for use of said angle decoder circuit in said frequency error correction process and a second one of said at least two modes is a phase error correction mode for use of said angle decoder circuit in said phase error correction process; and
a controller unit connected to said angle decoder circuit to select one of said at least two modes, wherein said controller unit is connected to said angle decoder to select one of said at least two modes and said frequency error correction unit and said phase error correction unit comprise said filter circuit and said angle decoder circuit for performing the respective error correction process.

23. A data communication receiver having a synchronization unit, said synchronization unit comprising:
a frequency error correction unit configured to perform a frequency error correction process;
a phase error correction unit configured to perform a phase error correction process;
a filter circuit capable of applying one of at least two different filter transfer functions, wherein a first one of said at least two different filter transfer functions is a frequency error correction filter transfer function for use in said frequency error correction process and a second one of said at least two different filter transfer functions is a phase error correction filter transfer function for use in said phase error correction process;
an angle decoder circuit configured to perform an angle decoder process in one of at least two modes, wherein a first one of said at least two modes is a frequency error correction mode for use of said angle decoder circuit in said frequency error correction process and a second one of said at least two modes is a phase error correction mode for use of said angle decoder circuit in said phase error correction process; and
a controller unit connected to said filter circuit to select one of said at least two different filter transfer functions, wherein said controller unit is connected to said angle decoder to select one of said at least two modes and said frequency error correction unit and said phase error correction unit comprise said filter circuit and said angle decoder circuit for performing the respective error correction process.

24. An integrated circuit chip for use in a data communication receiver, the chip comprising a synchronization circuitry, said synchronization circuitry comprising:
a frequency error correction unit configured to perform a frequency error correction process;
a phase error correction unit configured to perform a phase error correction process;
a filter circuit capable of applying one of at least two different filter transfer functions, wherein a first one of said at least two different filter transfer functions is a frequency error correction filter transfer function for use in said frequency error correction process and a second one of said at least two different filter transfer functions is a phase error correction filter transfer function for use in said phase error correction process;

an angle decoder circuit configured to perform an angle decoder process in one of at least two modes, wherein a first one of said at least two modes is a frequency error correction mode for use of said angle decoder circuit in said frequency error correction process and a second one of said at least two modes is a phase error correction mode for use of said angle decoder circuit in said phase error correction process; and a controller unit connected to said filter circuit to select one of said at least two different filter transfer functions, wherein said controller unit is connected to said angle decoder to select one of said at least two modes and said frequency error correction unit and said phase error correction unit comprise said filter circuit and said angle decoder circuit for performing the respective error correction process.

25. A method of operating a synchronization unit in a data communication receiver, the method comprising:

performing a frequency error correction process for correcting frequency errors;

performing a phase error correction process for correcting phase errors;

performing a filter process comprising applying one of at least two different filter transfer functions, wherein a first one of said at least two different filter transfer functions is a frequency error correction filter transfer function for use in said frequency error correction process and a second one of said at least two different filter transfer functions is a phase error correction filter transfer function for use in said phase error correction process;

performing an angle decoder process in one of at least two modes, wherein a first one of said at least two modes is a frequency error correction mode for use of said angle decoder process in said frequency error correction process and a second one of said at least two modes is a phase error correction mode for use of said angle decoder process in said phase error correction process, and performing a control process on said filter process comprising selecting one of said at least two different filter transfer functions, wherein performing a control process comprises selecting one of said at least two modes.

26. The method of claim 25, wherein said filter process is a loop filter process and said first filter transfer function comprises a first order low pass filter function and an accumulator function and said second transfer filter function comprises a frequency offset compensation function.

27. The method of claim 26, wherein said filter process is a loop filter process and said first filter transfer function comprises a second order low pass filter function and said second transfer filter function comprises a frequency offset compensation function.

28. The method of claim 27, wherein signals received by said angle decoder process are complex BPSK (binary phase shift keying) or QPSK (quadrature phase shift keying) modulated input signals.

29. The method of claim 28, wherein said angle decoder process is further providing a signal corresponding to a phase estimate proportional to a frequency offset of said received signals, when said frequency error correction mode is selected, and a signal corresponding to an estimate for a phase offset relative to a constellation diagram of said received signals, when said phase error correction mode is selected.

30. The method of claim 29, wherein said signal provided by said angle decoder process is further processed by said loop filter process.

31. The method of claim 30, wherein said loop filter process is further providing a signal corresponding to a filtered estimate for said frequency offset, when said frequency error correction filter transfer function is selected, and a signal corresponding to a filtered estimate for said phase offset, when said phase error correction filter transfer function is selected.

* * * * *